May 19, 1936. H. HARZ 2,041,177
VOLTAGE REGULATOR
Filed March 16, 1933
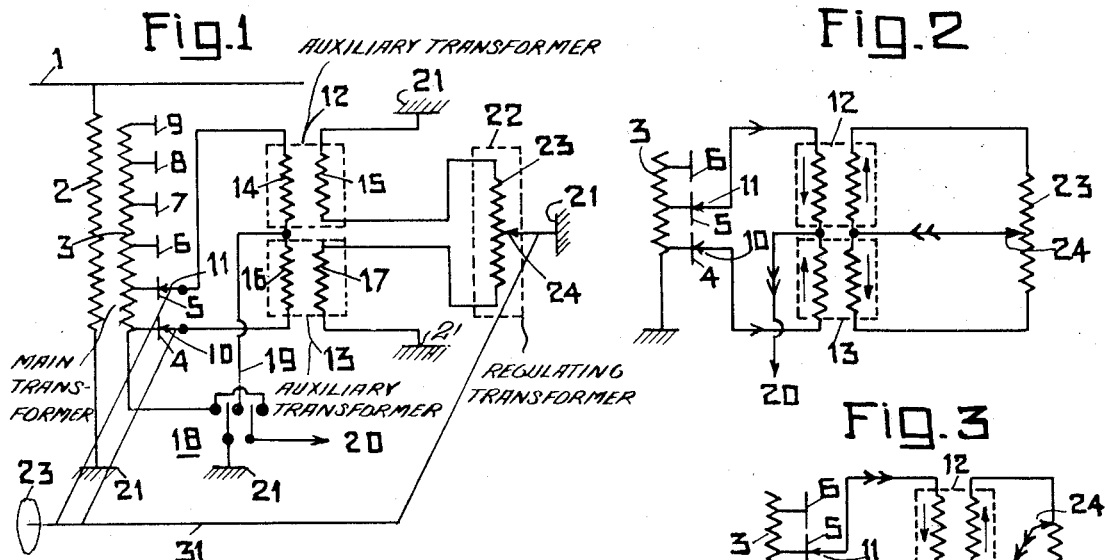
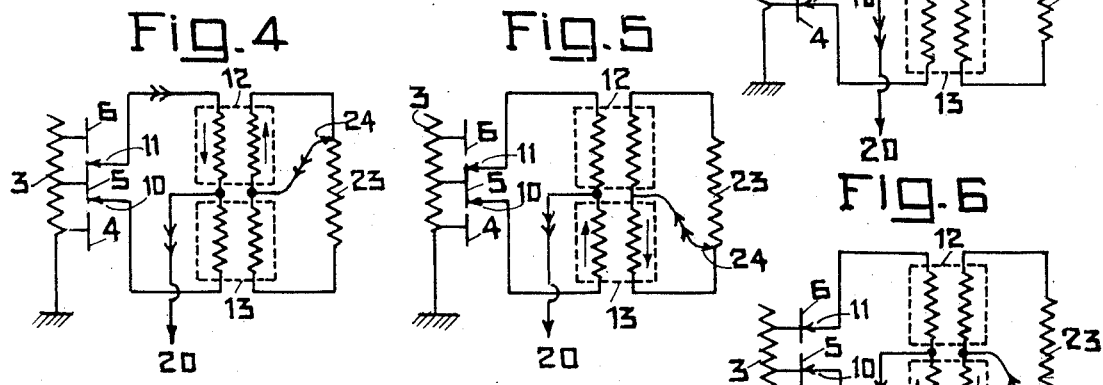
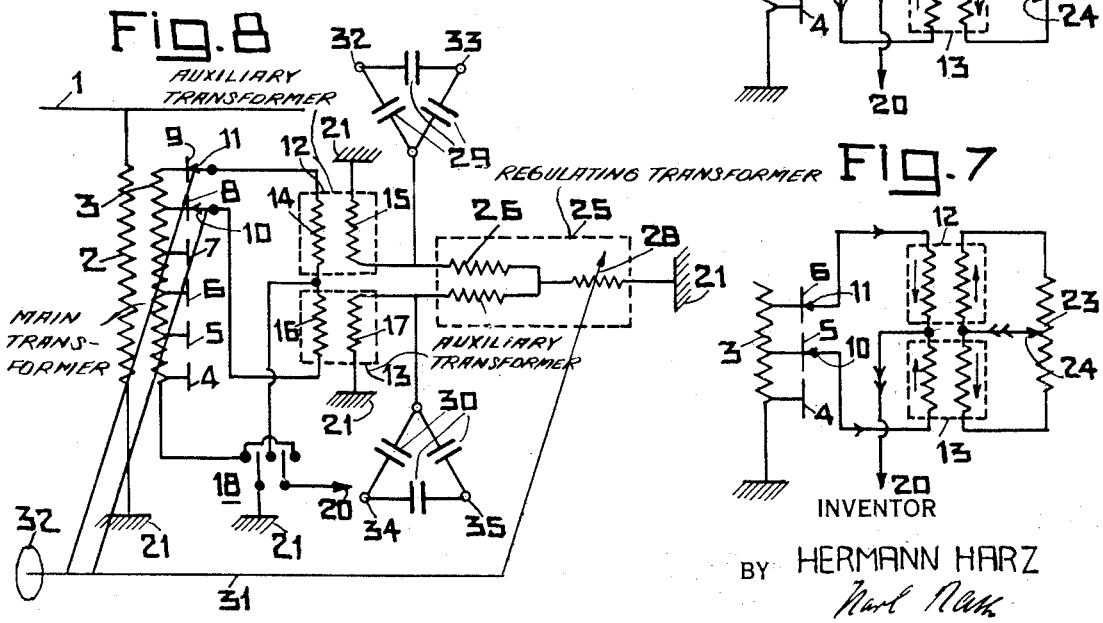
INVENTOR
BY HERMANN HARZ
ATTORNEY Patented May 19, 1936

2,041,177

UNITED STATES PATENT OFFICE 2,041,177

VOLTAGE REGULATOR

Hermann Harz, Berlin-Siemensstadt, Germany, assignor to Radio Patents Corporation, New York, N. Y., a corporation of New York Application March 16, 1933, Serial No. 661,083
In Germany March 24, 1932

23 Claims. (Cl. 171—119)

My invention relates to a method of and means for controlling the output voltage of electrical transformers, and more particularly to variable ratio type of potential regulators comprising essentially a transformer provided with means for changing the output E. M. F. either by cutting out portions of the winding or by imposing or adding the E. M. F. of auxiliary windings by means of taps in such a manner that the voltage may be increased or decreased step by step without requiring a disconnection of the transformer from its load circuit during the switching operation.

Voltage control under load is gaining increasing importance for use in electrical power transmission systems, such as for maintaining constant the voltage at the end of a transmission line independent of the voltage drop caused by the line, and for gradually varying the impressed voltage for controlling the speed of alternating current motors.

According to the prior art, simple and double rotary transformers were used for this purpose, but these were limited to special cases and only recently the cheaper and more efficient step-by-step voltage regulating transformers in connection with load switching devices have been introduced successfully into practice for efficient output voltage control in electric power equipment.

However, this method of controlling the output voltage possesses various inherent disadvantages residing primarily in the step-by-step change of the voltage rather than a gradual variation desirable in many cases. Furthermore, during the switching transition from one step to a successive step, the voltage difference between the steps must be absorbed and dissipated by inductive or ohmic impedance devices, whereby the load switch serves for interrupting the resulting equalizing current between the switching steps. Besides, it is not possible to prevent the total load current at a certain position of the load switch from flowing through the switching impedance, causing heating and undesired voltage drop, resulting in a deterioration of the switching contacts and an early burning-out and destruction of the impedance devices, such as load resistors.

Accordingly, it is an object of my invention to provide a new transformer system for continuous output voltage control in which the switching operation is performed substantially without the necessity of load impedance devices and consequent deterioration of the switching contacts and destruction of the impedance devices.

A further object of my invention consists in the provision of a voltage control system enabling both a step-by-step variation of the output voltage and a continuous variation from one step to another.

In order to avoid the above-mentioned drawbacks of step-by-step potential regulators known in the art, it has been suggested to provide a rotary transformer of special design in each phase, serving to bridge over the individual switching steps. A disadvantage of this solution, however, consists in that in the case of three phase current, three one-phase rotary transformers are required, greatly complicating the circuit and switching operation especially when operated by a common control means. Furthermore, transformers of this type are not simple in design and construction due to the special connections required and due to the usual provision of at least two step selector switches for each phase alternately operated in a currentless condition.

A further object of my invention is to overcome the aforementioned drawbacks.

The invention contemplates a novel arrangement for both step-by-step and continuous voltage control by means of transformers provided with taps and having at least two step selector switches for each phase. According to a specific embodiment of my invention, the step selectors are connected each across the non-concatenated primary winding of a transformer (intermediate transformer) to a common output conductor, the secondary windings of the mentioned transformers being connected each to one of a pair of winding systems of a further regulating transformer (bridging transformer), which latter is controlled in such a manner that the effective number of winding turns of one of its winding sections increases and becomes a maximum whereas the effective number of winding turns of the other of its winding sections decreases or reaches zero value, respectively, and vice versa. The bridging transformer fed from the secondary windings of the intermediate transformers may be of the type of an auto-transformer provided with taps and a variable neutral point connection, thus providing two winding sections.

It is also possible to use a rotary transformer serving as a bridging transformer with a stationary vector position of the controlled voltage such as a rotary transformer provided with three windings for each phase, two of which, having equal number of winding turns but wound in opposite sense, are arranged on the stator of the rotary transformer; and the third winding portion also having an equal number of winding turns as the first windings, being arranged on the rotor and being connected to the connecting lead between the stator windings arranged in series.

Instead of a regulating rotary transformer of this type, any equivalent arrangement may be used, as will become obvious, such as a transformer system comprising a rotary transformer and a standard core type transformer connected in a proper manner similar to the above three windings of a rotary transformer. In a transformer of this type when the stator is rotated, the effective primary or secondary number of winding turns varies with the cosine or sine, respectively, of the angle of rotation, resulting in a corresponding variation of the primary or secondary voltage, provided the magnetic flux remains at a constant value. These voltages, however, are displaced by an angle of 90°. By proper connection of the secondary windings of the transformer with the rotary transformer, it is possible to secure equal phase condition for the voltages in the primary windings of the intermediate transformers connected to the taps of the step transformer, irrespective of the phase difference of the voltages supplied by the rotary transformer.

Further features and objects of my invention will become apparent from the following detailed description with reference to the accompanying drawing in which I have illustrated schematically circuit arrangements embodying the novel features of my invention.

Figure 1 illustrates a variable voltage transformer system applicable for use in multi-phase power systems with a single phase shown only for the sake of greater simplicity and clearness of illustration.

Figures 2 to 7, inclusive, illustrate the successive steps of the switching operation taking place in a system shown by Figure 1 when the contacts are advanced from one transformer tap to another.

Figure 8 illustrates a similar system to Figure 1 with means comprising a special rotary potential regulator to effect a continuous transition and control from one switching step to a successive step.

Similar reference numerals identify similar parts throughout the different views of the drawing.

Referring more particularly to Figure 1, I have shown a transmission line 1 constituting one phase of a three phase system for the sake of simplicity and greater clearness of illustration. It is understood that a complete system according to Figure 1 for a three phase system will comprise three similar arrangements as shown interconnected in a desired fashion, such as in ring or star connection well known in the art. At 2, I have shown the primary winding of a transformer, hereinafter referred to as the main transformer, connected at one end to the line 1 and at its other end to ground or neutral point 21 of the system, such as in the case of a star connection of the individual phase windings of a multi-phase transformer.

The secondary winding 3 is provided with taps, 4, 5, 6, 7, 8 and 9 over which slide contacts or step selector switches 10 and 11 which are to be advanced from one contact to a successive contact when in a substantially currentless condition only to prevent arcing and early deterioration and destruction of the contacts. I have furthermore shown at 12 and 13, two standard type transformers, hereinafter referred to as auxiliary transformers, having primary windings 14 and 16 and secondary windings 15 and 17, respectively, and a potential regulator 22 of the auto-transformer type comprising a single winding 23 provided with a variable neutral point selector 24 connected to ground or the neutral point of the system 21. This regulator 22 will be referred to hereinafter as the fine regulator of the system. At 18 I have shown a two pole switch for reversing the controlled output voltage supplied through a common conductor 19 connected to the central connecting point of the primary windings 14 and 16 of transformers 12 and 13 and leading in either position of the switch 18 to the consumer indicated at 20.

The primary windings of both auxiliary transformers 12 and 13 are connected each with their outer ends to the step selectors 10 and 11, respectively, the remaining ends being joined together and leading through the common load conductor 19 to the consumer, as mentioned. The secondary windings of the transformers 12 and 13 are inter-connected such as by a star or delta connection and are furthermore connected to the open ends of the auto-transformer winding 23 provided with taps and a variable neutral point selector 24 as mentioned above.

The operation of my novel transformer control system as illustrated in Figure 1 will be described as follows: If the step selectors 10 and 11 are in the position as shown by Figure 1; that is, if selector 10 is in contact with the tap 4 and if selector 11 is in contact with tap 5 and the neutral point selector 24 of the auto-transformer 23 is in its central position as shown, the load current passing through conductor 19 is divided at equal parts upon the step selectors 10 and 11. At the same time, the voltage supplied to the consumer across the conductor 19 is equal to the voltage prevailing at the center point between taps 4 and 5. Thus, if the tap 4 carries a potential equal to one unit and if tap 5 carries a potential equal to two units, the potential supplied to the consumer 20 will be equal to 1.5 units, as is readily understood. The potential difference between the steps 4 and 5 is applied to the auto-transformer or fine regulator 23 and distributed equally over both winding parts formed due to the central position of the neutral point selector 24. The ampere turns produced by the load current passing through the conductor 19 act in opposite direction in both winding parts and accordingly cancel each other. This is shown in Figure 2 which equals Figure 1 but being simplified in that only those parts have been shown which are necessary for an understanding of the operation of the system. In Figure 2, the direction and intensity of the currents through the individual windings have been indicated by the direction and number of arrows, respectively.

Referring to Figure 3 illustrating the next step of operation, the selector 24 is moved in an upward direction in such a manner that the number of winding turns of the upper winding portion of the fine regulator 23 decrease with a corresponding increase of the number of winding turns of the lower portion of the fine regulator. Accordingly, the tapped voltage which has remained constant is divided over the now unequal winding portions. Since, however, the ampere turns produced by the load current must still cancel each other, the current through the lower winding portion with increased number of winding turns will decrease and the current through the upper winding portion with correspondingly decreased number of winding turns will increase. At the same time, the voltage in the secondary circuit decreases dependent on the displacement of the neutral point switch 24.

When finally the switch has reached its uppermost position, as shown by Figure 3, the number of winding turns of the upper winding portion becomes zero and accordingly the secondary of the transformer 12 and, by virtue of the inductive linkage, also its primary become short circuited whereas transformer 13 is connected to a transformer without secondary winding, thus being equivalent to a pure choke coil. The step voltage is now carried solely by the transformer 12 and the step selector 10 carries merely the exciting current for both transformers 13 and 23 which is of a negligible value. The step selector 11 carries the entire load current, as indicated in Figure 3 by the double arrow. The voltage in the secondary circuit is now determined by the potential at the tap 5 and would be equal to two units as compared to 1.5 units as compared with the position in accordance with Figure 2 according to the above example.

Now, the step selector 10 can be advanced to the contact 5 without any appreciable current flow therethrough. This is shown in the next step as illustrated by Figure 4. Only when the neutral point switch 24 is again moved downward, current will again begin to flow through the selector 10 and the transformer 13 with the simultaneous decrease of the current through the step selector 11. When the switch 24 has again reached its center position, both currents will be equal and when the switch 24 has reached its lowermost position according to the next switching stage shown by Figure 5, the step selector 10 will carry the entire current whereas now the current through the selector 11 has become substantially zero, as is readily understood. As long as both selectors are upon the same contact 5, the transformer 12 need not as yet carry potential but only after the step selector 11 has been moved to the next contact 6, illustrated by the following switching operation shown by Figure 6. By again moving the neutral point switch 24 in an upward position, the step selector 11 again will carry a current simultaneously relieving selector 10 until, if the switch 24 has arrived at its center position, the original condition is restored and the step selectors 10 and 11 have been advanced from taps 4 to 5 or taps 5 to 6 during a complete operating cycle, which may be repeated to move the selectors to the next transformer tap.

The system according to the invention may be described in general as characterized by a pair of step selectors or selector switches connected with a common load circuit through a pair of branch circuits alternately rendered free from current flow by purely magnetic or inductive means, as by magnetically choking or short circuiting, respectively, requiring neither mechanical contacts or load resistors, with the attendant disadvantages known in the prior art of voltage control transformers.

In Figure 8 I have shown another embodiment of the underlying idea of my invention in which a rotary transformer 25 is provided in place of an auto-transformer 22 with a variable neutral point. The latter includes three windings 26, 27, and 28, the former 26 and 27 having equal number of winding turns and connected in opposite sense being arranged on the stator of the rotary transformer and winding 28 being arranged on the rotor and connected to the mid-point between stator windings 26 and 27 arranged in series connection as shown.

If in a rotary transformer of this type the rotor with its winding 28 is rotated relative to the stator, the voltage between two steps of the main transformer is divided upon the primary windings of the transformers 12 and 13 in the proportion of the cosine to the sine of the angle of rotation of the winding 28 relative to the stator windings 26 and 27.

In transformers of this type, the supplied secondary voltages have a phase displacement of 90°. By suitable connection of the secondary windings of the transformers 12 and 13, however, it is possible to secure equal phase of the voltages in the primary windings of these transformers. This may be accomplished in an easy manner by connecting the three phases of one of the primary windings of the transformers 12 and 13 in star and by connecting the other of the primary windings of the transformers 12 and 13 in delta and by alternately exchanging the connections in the rotary transformer and by providing proper unequal number of winding turns.

When the rotatable winding 28 passes through its zero position with regard to both primary and secondary voltage, a change in polarity takes place. If this is undesirable for the regulating operation; that is, if it is desired to rotate the transformer in the same direction, the secondary windings of the transformers 12 and 13 may be reversed during the period of their short circuit in such a manner that the reversal may be effected without interruption of currents, and accordingly the reversing switches are free from potential and no power has to be disconnected. The reversal may be carried out automatically at a predetermined position of the rotary transformer.

The step selectors 10 and 11, during the regulating operation, carry no current, with the exception of the exciting current for the transformers of which merely the exciting current of the rotary transformer has an appreciable value. In order to relieve the step selectors also from this current, it is advisable to connect condensers 29 and 30 parallel to the transformers 12 and 13 as shown. These condensers, as illustrated, are preferably interconnected such as in star or delta connection as shown. In the illustration, condenser 29 is shown to be connected to transformer 12 and condenser 30 is connected with transformer 13 since the voltage at the transformer 12 has its maximum value when the voltage at the transformer 13 is equal to zero and vice versa. The condensers 29 and 30 are shown to be connected in delta with the remaining delta points 32, 33, 34, and 35 to be connected to the remaining phases of a complete three phase system in a manner similar to the connection for the one phase system shown in the illustration. It is also possible to connect the condensers in parallel to each of the primary windings of the rotary transformers or to one of the primary windings only.

By means of the circuit arrangement as described, it is possible to effect not only a connection of the individual steps of the regulating transformers under load without the disadvantages attendant to the step-by-step transformer known in the prior art, but besides it is possible to secure any desired intermediate position (fine regulation) without the necessity of increasing the taps provided at the transformer winding. On the contrary, a system according to the invention makes it possible to decrease the number of winding taps of a step-by-step regulating transformer in which case, however, it is necessary to increase the size of intermediate or auxiliary transformers and of the regulating transformer, as is readily understood.

The connection and disconnection of the step selectors 10 and 11 cooperating with the taps of the step-by-step transformer may be carried out automatically and simultaneously with the operation of the rotary transformer 25. I have indicated this in the drawing schematically by a common shaft 31 provided with mechanical means such as cams, etc. (not shown), and suitable device such as a hand-wheel 32 or other actuating device for performing the necessary mechanical switching operations for advancing the contact selectors 10 and 11 and rotating the stator of the rotary transformer 25, respectively, the particular mechanical design and construction of such switch arrangements being obvious and not forming a part of my present invention. The same applies with regard to the system shown by Figure 1.

Referring to Figure 8, if the connection and disconnection of the transformers 12 and 13 is to be carried out in a manner similar as described in connection with Figure 1, the rotary transformer will arrive in its initial position after 180 electric degrees and otherwise after 360°, and it is obvious that the mechanical drive of the step selectors has to be designed accordingly.

It is required frequently that the voltage of the step-by-step transformers be regulated between a positive maximum to an equal negative maximum value. Such regulation with step selectors moved backward and forward in a linear course may be accomplished in an arrangement as shown by Figure 1 by means of the reversing switch 18. As soon as the voltage has been decreased to zero from its positive maximum value by a movement of the step selectors to the tap 4 (position as shown in Figure 1 with switch 18 thrown to the left), the switch 18 may be reversed and the step selector, by a reversed movement, advanced towards the corresponding negative values, until a negative maximum value of the output potential is obtained. This arrangement may also be carried out in such a manner that the step selectors are arranged over a circular contact bank and continuously moved in the same direction, as will be obvious.

The transformers 12 and 13 may be preferably designed according to the type of current transformers, as single phase transformer, and interconnected electrically. They will then have only a single insulator serving as a connecting lead for the primary winding between which there exists only a comparatively low potential difference with the proper design determined by the value of the voltages between the two taps of the main transformer. However, it is possible also to use standard type three phase transformers to serve as intermediate transformers 12 and 13.

In place of an auto-transformer serving as potential regulator for fine regulation, a transformer with two windings and provided with taps may be provided. In this case, preferably each winding is controlled and both windings are arranged concentrically for decreasing magnetic leakage and are provided each with a separate neutral point connector.

Although I have described my invention with particular reference to the circuits and systems illustrated by the drawing which I wish to be regarded as illustrative only of the salient features and characteristics of the invention, it is obvious that the new underlying idea according to the invention is subject to various modifications and variations coming within the broadest scope and principle thereof as expressed by the ensuing claims.

I claim:

1. In combination with an electric potential regulator; a winding; taps from said winding; a pair of movable contacts arranged to be advanced alternately from one tap to a succeeding tap; a pair of auxiliary transformers having primary windings connected in series; circuit connections from each of the open ends of said primary windings to one of said contacts; means for connecting a load to the junction point of said windings; secondary windings of said transformers; a regulating transformer having a first winding connected to one of said secondary windings and having a second winding connected to said other secondary winding and means for increasing the number of turns of said first winding of said regulating transformer while simultaneously decreasing the number of turns of the said second winding of said regulating transformer for decreasing the effective number of load ampere turns of one of said first auxiliary transformers and at the same time increasing the effective number of load ampere turns of said other auxiliary transformers while maintaining the sum of said ampere turns substantially constant.

2. In combination with an electric potential regulator; a winding; taps from said winding; a pair of selector switches cooperating with said taps to be alternately advanced from one tap to the succeeding tap; a pair of auxiliary transformers arranged in series relationship; connections from the open ends of the primaries of said auxiliary transformers to said selector switches each; means for connecting a load circuit to the junction point of said primaries; a third regulating transformer connected with the concatenated secondaries of said auxiliary transformers and provided with a variable neutral point selector for alternately increasing the effective number of load ampere turns of one of said auxiliary transformers from zero to a maximum and at the same time decreasing the effective number of load ampere turns of the other of said auxiliary transformers from maximum to zero while maintaining the sum of said ampere turns substantially constant and constantly balancing the primary and secondary ampere turns of each of said auxiliary transformers.

3. In combination with an electric potential regulator; a winding; taps from said winding; a pair of selector switches cooperating with said taps to be alternately advanced from one tap to a succeeding tap; a pair of substantially equal auxiliary transformers having both primary and secondary windings arranged in series relationship and having their open primary ends connected each to one of said selector switches; means for connecting a load circuit to the junction point of the primaries of said auxiliary transformers; a further regulating transformer having a winding provided with a variable tap connected to the junction point of the secondaries of said auxiliary transformers; and connections from the open ends of said regulating transformer to the respective open ends of the secondary windings of said auxiliary transformers.

4. In combination with an electric potential regulator; a winding; taps from said winding; a pair of selector switches cooperating with said taps to be alternately advanced from one tap to a succeeding tap; a pair of auxiliary transformers arranged in series relationship having their open ends connected each to one of said selector switches; means for connecting a load circuit to the junction point of the primaries of said auxiliary transformers; and a rotary potential regulator having two oppositely wound stator windings arranged in series relationship and a rotatable rotor winding connected to the junction point of said stator windings; and connections from said stator windings to the secondary windings of said auxiliary transformers for gradually increasing the effective number of load ampere turns of one of said transformers from zero to a maximum and at the same time gradually decreasing the effective number of load ampere turns of the other of said transformers in accordance with the rotation of said rotor winding while maintaining the sum of said ampere turns substantially constant.

5. An electrical system comprising a source of current; a pair of substantially equal transformers having primary and secondary windings being connected to said source in series; a circuit connection between two ends of said secondary windings whereby the E. M. F.'s induced therein from their primaries are added; a regulating autotransformer comprising a winding with a variable tap, said regulating transformer being connected between the remaining open ends of said secondary windings; a connection from said variable tap to the junction point of said secondary windings; and a load circuit connected to the junction point of said primary windings.

6. In combination with an electric potential regulator; a winding; taps from said winding; a pair of movable contacts cooperating with said taps to be alternately advanced from one tap to a succeeding tap; a pair of auxiliary transformers having their primaries arranged in series, each of the remaining ends of said primaries being connected to one of said contacts; means for connecting a load circuit to the junction of said transformer primaries; and a regulating transformer having a primary and a secondary winding each connected across one of the secondaries of said auxiliary transformers and means for alternately increasing the effective number of winding turns of one winding of said regulating transformer from zero to a maximum and at the same time decreasing the effective number of winding turns of the other winding of said regulating transformer from maximum to zero while constantly maintaining the load ampere turns of the primary and secondary windings of said regulating transformer substantially balanced.

7. In combination with an alternating current electrical circuit; a source of current; an external circuit connected across said source; a pair of parallel branch circuits in series therewith, each having one end connected to a point of different potential of said source; means for gradually shifting current between said branch circuits, said means comprising a pair of transformers having their primaries inserted each in one of said branch circuits; a regulating transformer having a pair of windings connected each across one of the secondary windings of said transformers; and means for increasing the effective number of winding turns of one of said last mentioned windings and at the same time decreasing the effective number of winding turns of the other of said last mentioned windings while constantly maintaining the sum of load ampere turns for said last mentioned windings substantially balanced.

8. In an alternating current electrical system, a source of current; an external circuit connected across said source; a pair of parallel branch circuits in series therewith, said branch circuits being further connected to points of different potential of said source; means for shifting current between said branch circuits comprising a pair of transformers having their primaries inserted each in one of said branch circuits; a regulating transformer having a winding with a variable tap; connections from said regulating transformer and said tap to the secondary windings of said first transformers for increasing the effective number of winding turns of one of said first mentioned transformers and at the same time decreasing the effective number of winding turns of the other of said first mentioned transformers by varying said tap while constantly maintaining the load ampere turns of said transformers substantially balanced.

9. In an alternating current electrical circuit, a source of current; an external circuit connected across said source; a pair of parallel branch circuits in series therewith, said branch circuits being further connected to points of different potential of said source; means for shifting current between said branch circuits comprising a pair of transformers having their primaries inserted each in one of said branch circuits; a regulating transformer comprising two windings; circuit connections from each of said windings to the secondaries of said auxiliary transformers; and means for increasing the effective number of winding turns of one of said last mentioned windings from zero to a maximum and at the same time decreasing the effective number of winding turns of the other of said last mentioned windings from a maximum to zero while constantly maintaining the load ampere turns of said last mentioned windings substantially balanced.

10. In combination with an electric potential regulator, a winding; taps from said winding; a pair of tap selectors cooperating with said taps to be alternately advanced from one tap to a succeeding tap; a pair of auxiliary transformers arranged in series with each of the open ends of their primaries connected to one of said selector switches; means for connecting a load circuit to the junction of said transformer primaries; a regulating transformer having a pair of windings; circuit connections from each of said last mentioned windings to the secondaries of said auxiliary transformers; and means for increasing the effective number of winding turns of one of said last mentioned windings from zero to a maximum and simultaneously decreasing the effective number of winding turns of the other of said last mentioned windings from a maximum to zero while constantly maintaining the load ampere turns of said last mentioned windings substantially balanced.

11. An electrical system comprising a source of current, an external circuit connected across said source; a pair of parallel branch circuits in series with said external circuit each having one end connected to a point of different potential on said source; a pair of transformers having primary and secondary windings, each of said primary windings being connected in one of said branch circuits; and means connected to said secondary windings for increasing the effective number of winding turns of one of said transformers and at the same time decreasing the effective number of winding turns of the other of said transformers while constantly maintaining the load ampere turns of said transformers substantially balanced.

12. An electrical system comprising a source of current, an external circuit connected across said source; a pair of parallel branch circuits in series with said external circuit each having one end connected to a point of different potential on said source; a pair of transformers having primary and secondary windings, each of said primary windings being inserted in one of said branch circuits; and means magnetically interlinking said secondary windings for increasing the effective number of winding turns of one of said transformers and simultaneously decreasing the effective number of winding turns of the other transformer while constantly maintaining the load ampere turns of said transformers substantially balanced.

13. An electrical system comprising a source of alternating current, an external circuit connected across said source; a pair of parallel branches in series with said external circuit, one end of each of said branches being connected to a point of different potential on said source; a pair of transformers each having a primary and secondary winding, each of said primary windings being inserted in one of said branches; a circuit connection between the ends of said secondary windings whereby said windings are in series with regard to induced voltages from their primary windings; a third transformer having a pair of windings each connected across one of the secondary windings of said first transformers; and means for increasing the effective number of winding turns of one of said windings of said third transformer and simultaneously decreasing the effective number of winding turns of the other winding of said third transformer while constantly maintaining the load ampere turns for both windings of said third transformer substantially balanced.

14. In combination with an electric potential regulator; a winding; taps from said winding; a pair of movable contacts arranged to be alternately advanced from one tap to a succeeding tap; a pair of transformers having primary windings connected in series; connections from each of the open ends of said primary windings to one of said contacts; means for connecting a load to the junction of said primary windings; secondary windings of said transformers; and means connected to said secondary windings for increasing the effective number of winding turns of one of said transformers and at the same time decreasing the effective number of winding ampere turns of the other of said transformers while maintaining the sum of the load ampere turns of said transformers substantially balanced.

15. In combination with an alternating current electrical circuit; a source of current; a main circuit; a pair of parallel branch circuits included in series therein; said branch circuits being further connected to points of different potential of said source; means for shifting current between said branch circuits, said means comprising a pair of inductance windings each inserted in one of said branch circuits; and means magnetically interlinking said windings for increasing the effective number of winding turns of one of said windings and at the same time decreasing the effective number of winding turns of the other of said devices while constantly maintaining the load ampere turns of said devices substantially balanced.

16. An electrical system comprising a source of current; an external circuit connected to said source; a pair of parallel branches in said external circuit, each of said branches having one end connected to a point of different potential of said source; means for gradually shifting current between said branches, said means comprising a pair of substantially equal inductance windings each inserted in one of said branch circuits; a substantially leakageless magnetic circuit interconnecting said inductance windings; and means for increasing the number of effective winding turns of one of said windings and simultaneously decreasing the number of effective winding turns of said other winding while constantly maintaining the load ampere turns of both of said windings substantially balanced.

17. An electrical system comprising a source of current; an external circuit connected to said source; a pair of parallel branches in said external circuit, each of said branches having one end connected to a point of different potential of said source; means for gradually shifting current between said branches; said means comprising a pair of substantially equal inductance windings each inserted in one of said branches; a substantially leakageless magnetic circuit interconnecting said inductance windings; and means for increasing the number of effective winding turns for one of said windings and simultaneously and equally decreasing the number of effective winding turns of said other winding while constantly maintaining the load ampere turns of both of said windings substantially balanced.

18. An electrical system comprising a source of current; an external circuit connected to said source; a pair of parallel branches in said external circuit, each of said branches having one end connected to a point of different potential of said source; means for gradually shifting current between said branches, said means comprising a pair of transformers each having its primary connected in one of said branches; a pair of inductance windings interlinked by a substantially leakageless magnetic circuit, each of said windings being connected across the secondary of one of said transformers; and means for increasing the effective number of winding turns of one of said inductance windings and simultaneously decreasing the effective number of winding turns of said other inductance winding while constantly maintaining the load ampere turns of both of said inductance windings substantially balanced.

19. In combination, a source of alternating current; a pair of inductance windings connected in series and across said source; an external circuit between the junction of said windings and one terminal of said source; means for producing a substantially leakageless magnetic circuit interlinking said windings; and means for increasing the effective number of winding turns of one of said windings and simultaneously decreasing the effective number of winding turns of said other winding while constantly maintaining the effective load ampere turns for said windings balanced.

20. In combination, a source of alternating current; a pair of substantially equal transformers having primary and secondary windings, said primary windings being connected in series and across said source; an external circuit connected between the junction of said primary windings and one terminal of said source; a pair of inductance windings each connected across one of the secondary windings of said transformers; means for producing a substantially leakageless magnetic circuit interlinking said inductance windings; further means for increasing the effective number of winding turns of one of said inductance windings and simultaneously decreasing the effective number of winding turns of said other inductance winding while constantly maintaining the effective load ampere turns of said inductance windings balanced.

21. In combination, a source of alternating current; a pair of equal transformers having their primaries connected in series and across said source; an external circuit connected between the junction of said primaries and one terminal of said source; a pair of inductance windings; means for producing a substantially leakageless magnetic circuit interconnecting said inductance windings, said inductance windings being in series, each of the open ends thereof being connected to one end of each of the secondaries of said transformers; and a common variable tap for said inductance windings connected to both of the remaining ends of the secondaries of said transformers.

22. In combination, a source of alternating current; a pair of equal transformers having their primaries connected in series and across said source; an external circuit connected between the junction of said primaries and a pole of said source; a rotary transformer having a stator and a pair of substantially equal windings thereon wound in opposite sense and connected in series; and a rotor carrying a winding having one end connected to one end of both secondary windings of said transformers; and connections from each of the remaining ends of the secondary windings of said transformers to the open ends of each of said stator windings.

23. In an electric potential regulator, a winding; taps from said winding; a pair of tap selectors cooperating with said taps to be alternately advanced from one tap to a succeeding tap; a pair of transformers having primary and secondary windings, the primary and secondary winding of one of said transformers being connected in series with the primary and secondary winding, respectively, of the other of said transformers, each of the open ends of said primary windings being connected to one of said selectors; means for connecting a load circuit to the junction of said primary windings; an auto transformer having a winding with a variable contact connected to the junction of the secondary windings of said transformers; and circuit connections from each of the open ends of said auto transformer to one of the open ends of the secondary windings of said transformers, respectively.

HERMANN HARZ.